Nov. 28, 1939.　　H. L. SPAUNBURG ET AL　　2,181,712
GEARING FOR LIQUID DISPENSING APPARATUS
Filed Aug. 11, 1937　　4 Sheets-Sheet 1

Inventors:
Harvey L. Spaunburg,
Edward A. Slye,

Inventors:
Harvey L. Spaunburg,
Edward A. Slye,

Nov. 28, 1939.   H. L. SPAUNBURG ET AL   2,181,712
GEARING FOR LIQUID DISPENSING APPARATUS
Filed Aug. 11, 1937   4 Sheets-Sheet 4
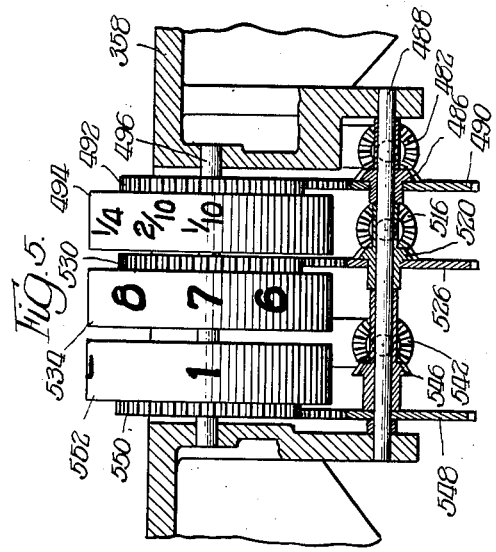
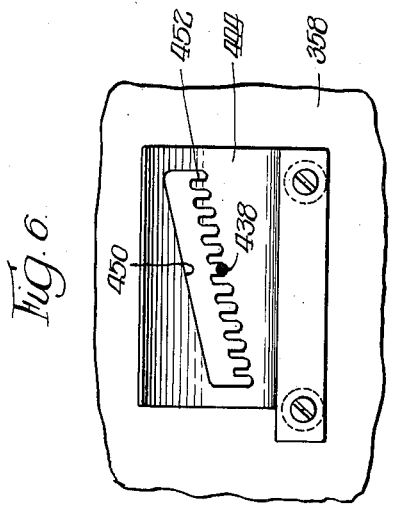
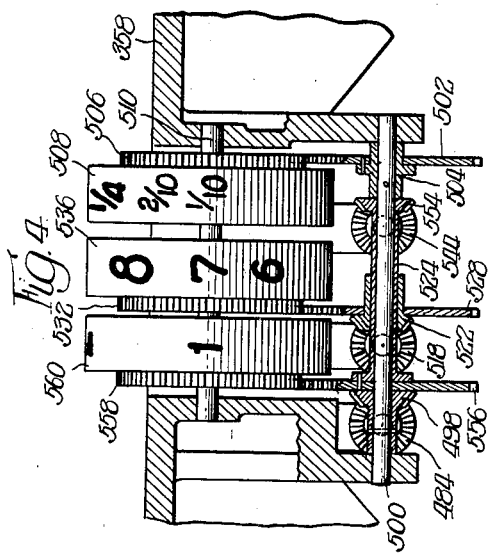
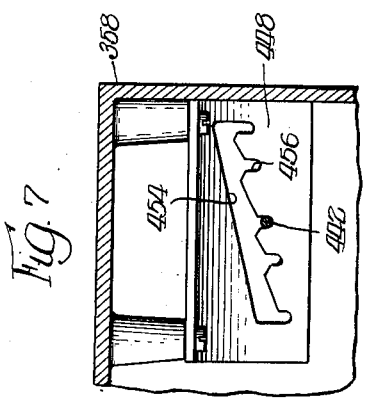
Inventors:
Harvey L. Spaunburg,
Edward A. Slye, Patented Nov. 28, 1939

2,181,712

UNITED STATES PATENT OFFICE 2,181,712

GEARING FOR LIQUID DISPENSING APPARATUS

Harvey L. Spaunburg, Bristol, and Edward A. Slye, East Hartford, Conn., assignors, by mesne assignments, to The Wayne Pump Company, Fort Wayne, Ind., a corporation of Maryland Application August 11, 1937, Serial No. 158,597

12 Claims. (Cl. 74—283)

This invention pertains to liquid dispensing apparatus.

Liquid dispensing apparatus now in use are of two principal types, namely, the so-called visible type, and the meter type. The more desirable of these two types is the meter type, which consists essentially of an operating pump connected to a source of liquid supply, the pump being adapted to supply liquid to a meter where it is measured, after which it is dispensed through the usual hose and nozzle connection. The meter is adapted to operate a clock or other recording mechanism to show the amount of liquid dispensed through the hose and nozzle. It is customary to provide this type of liquid dispensing apparatus with a card to be displayed somewhere on the casing adjacent the clock, the card being used to compute the price of any amount of gasoline or other liquid dispensed from the device. The objections to this method of computation are that for different localities different cards must be used as the prices vary, and of course the prices vary for the same localities from time to time. There is then the liability that the cards may not be supplied at the proper time, and also the objection that the figures on the computing card are so small that the customer purchasing gasoline from a dispensing station cannot see the numerals from this automobile, there being grave dangers of error in either case. There is a further objection that the prices on these cards are only for full gallon units, and if a fraction of a gallon is dispensed there is no way of accurately determining the cost of this amount. Also, in meter pumps there is no positive way to dispense only a unit, and so in case the registering hand of the clock overruns the unit measure, either the customer has to pay an estimated amount, or the service station owner has to lose this fraction of a unit to the customer.

In order to provide a liquid dispensing apparatus which will fulfill all service requirements, a computing pump has been devised wherein both price and the amount dispensed are indicated. This pump consists essentially of a motor driven pump, a meter, and a dispensing hose connected to the meter through a sight gauge, the meter being preferably of the displacement type for operating the indicating device.

The indicating device includes a variator which provides a ready adjustment between the amount computing portion of the clock and the price computing portion. In order to indicate the current price, numeral wheels or other indicia are provided above the meter so that the customer can readily see the prevailing price. As the current price changes, it is of course necessary to reset the computing device or the variator whereby a proper compensation is provided between the price and the amount; and in the present application means is provided between the current price indicia and the variator whereby the current price is regulated and controlled directly by the setting means of the variator.

It is therefore an object of this invention to provide a computing head for liquid dispensing apparatus which itself registers both the amount of liquid dispensed and the total price of such liquid dispensed.

Another object is to provide a computing head for liquid dispensing apparatus wherein means is provided for indicating the total price of any amounts of liquid dispensed as, for instance, gallons or fractions thereof, the means being adjustable at the liquid dispensing apparatus to correspond to any price variations of units dispensed.

A further object is to provide a readily adjustable variator means, and operating means interposed between the variator means and the current price indicia, whereby the current price indicia is regulated with the variator means.

A still further object is to provide a computing head for a liquid dispensing apparatus having a speed variator and registering means associated therewith, the adjustments for said speed variator being on a single panel.

Yet a further object is to provide a variator means for a computing head having adjustments thereon which automatically tend for complete variator engagement.

Another further object is to provide a speed variator for a liquid dispensing apparatus which is not reversible, is inexpensive to manufacture and maintain, and fulfills all requirements of manufacture and service.

With these and various other objects in view, the invention may consist of certain novel features of construction and operation as will be more fully described and particularly pointed out in the specification, drawings and claims appended hereto.

In the drawings, which illustrate embodiments of the device and wherein like reference characters are used to designate like parts—

Figure 4 is an enlarged fragmentary elevation of one of the daily price indicating means, the same looking toward the right as viewed in Figure 3;

Figure 5 is an enlarged fragmentary elevation of one of the daily price indicating means, the same looking toward the left as viewed in Figure 3;

Figure 6 is a plan view of one of the price setting quadrants, the same looking in the direction of arrows 6—6 of Figure 2;

Figure 7 is a plan view of another of the price setting quadrants, the same looking in the direction of arrows 7—7 of Figure 2;

Figure 8 is a bottom plan view of the gear cone snowing the brake or irreversible mechanism.

In the computing device for liquid dispensing apparatus illustrated herein, the speed variator indicated is of course adapted to be associated with registering or indicating means such as is generally shown and described in application Serial No. 158,596, filed August 11, 1937, the same being the joint invention of Harvey L. Spaunburg, Edward Wild and Otto Wild, Jr. The computing head, including the variator and registering or indicating mechanism, is adapted to be associated with a liquid dispensing apparatus such as illustrated in Jauch et al. Patent No. 1,888,533, granted November 22, 1932, and driven by the meter thereof. In the construction shown in said patent a meter shaft is operated in accordance with liquid passing through the meter and drives an operating shaft which, in turn, drives the variator connected to indicating means for showing the cost of the liquid dispensed, the meter shaft also driving indicating means for showing the amount of the liquid dispensed.

Figure 1:
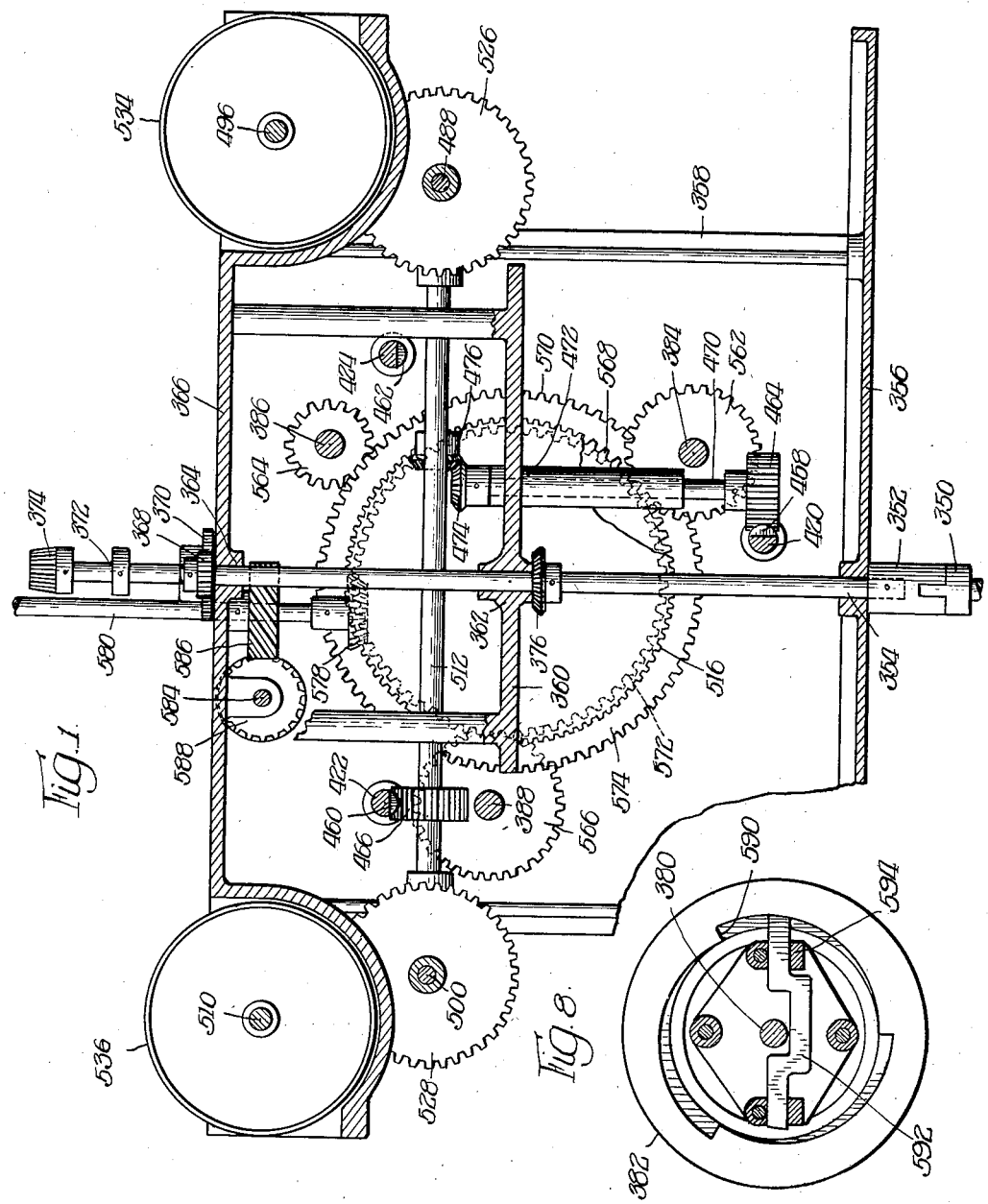
Figure 1 is an enlarged sectional elevation through the drive shaft of a different form of variator embodying the invention, the same being taken substantially in the plane as indicated by the line 1—1 of Figure 3.
Figure 2:
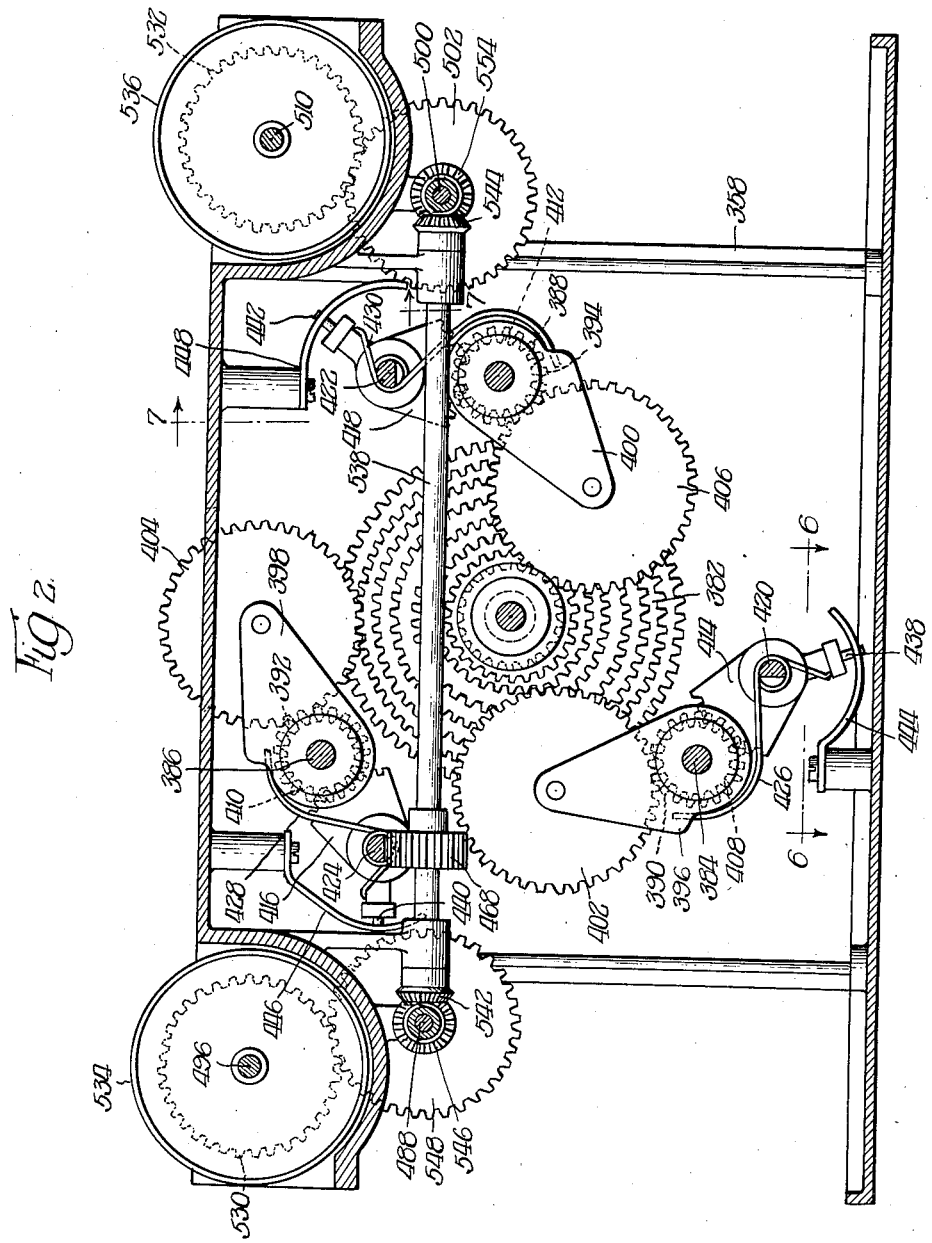
Figure 2 is a vertical sectional elevation through the variator mechanism of the construction illustrated in Figure 1, the same being taken substantially in the plane as indicated by the line 2—2 of Figure 3.
Figure 3:
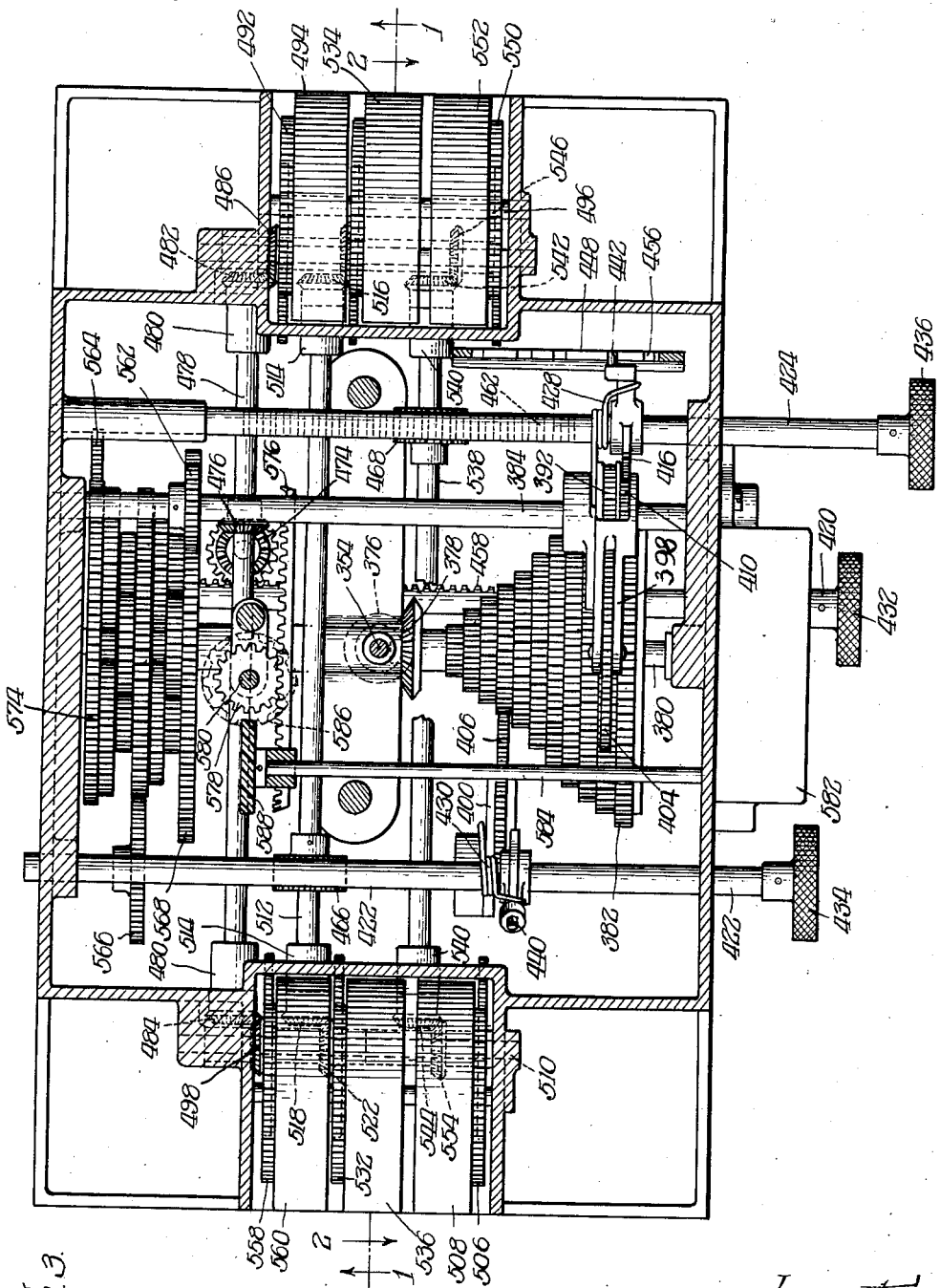
Figure 3 is a sectional top plan view of the variator mechanism illustrated in Figures 1 and 2.

In this variator the meter shaft 350, operated in accordance with liquid passing through the meter, is connected to the vertically extending operating shaft 352, said shaft being journaled as at 354 in the bottom plate 356 of the variator housing 358. Said shaft is journaled in the central supporting member 360 as at 362 and extends through the journal 364 in the top plate 366 of said housing, and is provided with the gear 368, said gear meshing with the gear 370 on the jack shaft 372. The upper end of said jack shaft is provided with the bevel gear 374 adapted to be connected to the amount or gallons portion of the register such as shown at 62 in Figures 1, 2 and 3 of said application serial No. 158,596. The shaft 354 is provided with the bevel gear 376 in mesh with the bevel gear 378 provided on the horizontally disposed drive shaft 380, said drive shaft being provided with the gear cone or gear steps 382.

Disposed adjacent the drive shaft 380 and substantially parallel therewith these are provided three supplementary shafts, shaft 384 being the tenths cent shaft, shaft 386 being the cents or unit shaft, and shaft 388 being the tens of cents shaft. The supplementary shafts are provided with the gears 390, 392 and 394 non-rotatably mounted on the respective shafts but mounted for sliding movement thereon such as by a suitable key connection. Embracing each of said gears on the supplementary shafts there is provided a gear shifting arm 396, 398 and 400, each of said arms being slidably mounted on the shafts and being provided with the cone engaging gears 402, 404 and 406 adapted to selectively engage the gear steps of the cone, said gears meshing with the slidable gears 390, 392 and 394 mounted on the supplementary shafts, the gears 402, 404 and 406 being so disposed as shown that rotation of the cone does not tend to throw them out of mesh with the cone. The gear shifting arms 396, 398 and 400 respectively, are provided with gears 408, 410 and 412 non-rotatably mounted on said arms and being in meshing engagement with the teeth of the associated quadrants 414, 416 and 418, said quadrants being fixedly mounted on the gear shifting shafts 420, 422 and 424, said shafts being provided with the springs 426, 428 and 430 engaging the associated gear shifting arms and normally urging said arms toward the cone whereby the respective cone engaging gears 402, 404 and 406 are urged toward engagement with the gear cone. The gear shifting shafts are preferably provided with the knobs 432, 434 and 436 for conveniently rotating and bodily moving said gear shifting shafts in a longitudinal direction.

Each of the gear shifting quadrants 414, 416 and 418 is provided with a projecting pin 438, 440 and 442, said pins being adapted to be received in suitable notches disposed adjacent a slot provided in positioning quadrants 444, 446 and 448 suitably secured in the variator housing, said notches corresponding to the gear steps. The quadrants 444 and 446 are similar, the quadrant 444 being shown specifically in Figure 6. Said quadrant is provided with the slot 450 provided with the notches 452 corresponding to the number of gear steps, said notches being so disposed that when the pin 438 is engaged in the notches, the cone engaging gear is meshing with the selected step of the gear cone. The quadrant 448 is provided with the slot 454 adjacent the notches 456, said notches being so disposed as to correspond to the proper gear step. In the embodiment shown, the pin 442 is for the tens of cents shaft, and the quadrant 448 is provided with only five notches, one for zero position, and the remaining four for ten, twenty, thirty and forty cents, respectively. In the case of quadrants 444 and 446, notches are provided for the zero position of the gear shifting levers. In the case of the tenths quadrant a notch is provided for every one-tenth of a division, and at one quarter and three-quarters of a division from zero to nine-tenths, while in the case of the cents quadrant 446, a notch for every cent division is provided from zero to nine cents. In the zero position, the cone engaging gears 402, 404 and 406 are non-rotatably locked out of engagement from the gear cone.

The slidable gear shifting shafts 420, 422 and 424 are journaled for sliding movement in the housing 358 and are provided with the racks 458, 460 and 462, said racks being in mesh with the pinions 464, 466 and 468. The pinion 464 is non-rotatably mounted on the vertical shaft 470 suitably journaled as at 472 to the support 360, and the upper end of said shaft is provided with the bevel gear 474 meshing with the bevel gear 476 provided on the horizontal counter control shaft 478. This counter control shaft extends to opposite sides of the housing 358 and is journaled therein as at 480, the ends of said shaft being provided with the bevel gears 482 and 484.

The bevel gear 482 is connected to the bevel gear 486 rotatably mounted on the shaft 488. The bevel gear 486 is provided with the pinion 490 meshing with the pinion 492 provided on the tenths cent daily price indicating wheel 494, said wheel 494 and pinion 492 being rotatably mounted on the supporting shaft 496 supported in the housing 358. The bevel gear 484 meshes with the bevel gear 498 fixed to the shaft 500, said shaft being journaled in the housing 358 and said shaft is provided with the pinion 502 fixedly mounted thereon as by the spacing member 504, said pinion meshing with the gear 506 provided on the opposite tenths cent daily price wheel 508, said wheel 508 and said gear 506 being rotatably mounted on the shaft 510 supported by the housing 358.

The gear 466 is non-rotatably mounted on the transversely extending counter control shaft 512 disposed substantially parallel to the shaft 478 and being suitably journaled at its opposite ends as at 514 in the housing. The opposite ends of the shaft are provided with the bevel gears 516 and 518, respectively meshing with the bevel gears 520 and 522, the bevel gear 520 being rotatably mounted on the shaft 488, and the bevel gear 522 being rotatably mounted on the sleeve 524, said sleeve being rotatably mounted on the shaft 500. The bevel gears 520 and 522 are respectively provided with the pinions 526 and 528, said pinions meshing with gears 530 and 532 provided on the cents or units daily price indicating wheels 534 and 536, said wheels being rotatably mounted on shafts 496 and 510.

The pinion 468 is non-rotatably mounted on the transversely extending counter control shaft 538 likewise disposed in parallel relation with the shaft 478 and being suitably journaled as at 540 in the housing 358. The ends of the shaft 538 are provided with the bevel gears 542 and 544. The bevel gear 542 meshes with the bevel gear 546 rotatably mounted on the shaft 488 and provided with the pinion 548 meshing with the gear 550 provided on the tens cent daily price indicating wheel 552 rotatably mounted on the shaft 496. The bevel gear 544 meshes with the bevel gear 554 provided on the sleeve 524, said sleeve being provided with the pinion 556 meshing with the gear 558 of the tens of cents daily price indicating wheel 560 rotatably mounted on the shaft 510.

With this construction it will be seen that rotation of the gear shifting shafts 420, 422 and 424 will disengage the respective pins 438, 440 and 442 from the notches of the adjacent quadrants, whereupon longitudinal movement of said gear shifting shafts will cause not only the setting of the cone engaging gears as has been explained, but will simultaneously cause rotation of the shafts 478, 512 and 538 to move the daily price indicating wheels to show at what price the variator is set to compute.

The supplementary shafts 384, 386 and 388 are provided with the pinions 562, 564 and 566, said pinions being non-rotatably mounted on the respective shafts, said gears meshing respectively with the gears 568, 570 and 572 of the differential mechanism 574 similar to that described in Figures 1 to 16 inclusive of application Serial No. 158,596. The differential gearing is adapted to operate the crown gear 576 which in turn is adapted to rotate the gear 578 non-rotatably mounted on the shaft 580, said shaft being adapted to be connected to and drive the cost indicating portion of the register, said cost indicating portion being the top bank of the numeral wheels of the indicator. In this construction, as in the construction shown in said application Serial No. 158,596, totalizers indicated generally at 582 may be provided, the cost totalizer being driven by the shaft 580 connected to the cost totalizer drive shaft 584 through the worm and gear 586–588, and the gallons totalizer being driven by the shaft 380.

It is of course understood that the brake mechanism described in said application Serial No. 158,596 may be used with the horizontal cone construction and mounted within said cone 382 on the side of housing 358. In this case, as shown in Figure 8, the cone 382 is provided with the inwardly extending teeth or stops 590 which are adapted to reciprocate the locking member 592 slidably mounted in the housing 594 secured to the housing 358, the housing 594 being mounted in the bottom of the gear cone. The cone driving in normal operation merely reciprocates the member 592, but should the cone tend to rotate in an opposite direction it will be prevented from doing so by engagement between the members 590 and 592.

It is to be understood that we do not wish to be limited by the exact embodiments of the device shown, which are merely by way of illustration and not limitation, as various other forms of the device will of course be apparent to those skilled in the art without departing from the spirit of the invention or the scope of the claims.

What is claimed is:

1. In a device of the character described, the combination of a drive shaft adapted to be connected to indicating mechanism, a gear cone mounted to rotate with said drive shaft, a plurality of supplemental shafts disposed adjacent said cone and being substantially parallel with said drive shaft, a driven shaft adapted to be connected to other indicating mechanism, differentially arranged gear means operatively connecting said supplemental shafts to said driven shaft, a gear slidably and non-rotatably mounted on each of said supplemental shafts, a movable member mounted to move with each of said last named gears, a shifting gear carried by each of said movable members operatively connected to the slidable gear and adapted to engage a selected step of said cone, and means for selectively engaging said shifting gear with said gear steps, said means including a plurality of shafts parallelly disposed, each of said shafts having operating means thereon disposed at the same ends of said shafts.

2. In a device of the character described, the combination of a drive shaft adapted to be connected to indicating mechanism, gear steps mounted to rotate with said drive shaft, a supplemental shaft disposed adjacent said gear steps and being substantially parallel to the axis of said gear steps, a driven shaft adapted to be connected to other indicating means, means connecting said driven and supplemental shafts, a shifting arm movably mounted on said supplemental shaft and provided with a gear adapted to engage the selected gear steps, a connection between said gear and supplemental shaft, a gear provided on said arm, a setting shaft slidably mounted adjacent said supplemental shaft, a gear connection between said last named gear and said setting shaft, resilient means between said arm and said setting shaft urging said first named gear into engagement with a gear step, a quadrant disposed adjacent said setting shaft and having notches therein corresponding to the gear steps, sloping portions between said notches, an arm fixed to said setting shaft and movable with said gear connection, said arm being adapted to be received in a notch when the corresponding gear step is engaged by said first named gear, said spring causing said last named arm to be moved into a notch if said arm engages a sloping portion of said quadrant.

3. In a device of the character described, the combination of a drive shaft adapted to be connected to indicating mechanism, gear steps mounted to rotate with said drive shaft, a supplemental shaft disposed adjacent said gear steps and being substantially parallel to the axis of said gear steps, a driven shaft adapted to be connected to other indicating means, means connecting said driven and supplemental shafts, a shifting arm movably mounted on said supplemental shaft and provided with a gear adapted to engage the selected gear steps, a connection between said gear and supplemental shaft, a gear provided on said arm, a setting shaft slidably mounted adjacent said supplemental shaft, a gear connection between said last named gear and said setting shaft, resilient means between said arm and said setting shaft urging said first named gear into engagement with a gear step, a quadrant disposed adjacent said setting shaft and having notches therein corresponding to the gear steps, sloping portions between said notches, an arm fixed to said setting shaft and movable with said gear connection, said arm being adapted to be received in a notch when the corresponding gear step is engaged by said first named gear, said spring causing said last named arm to be moved into a notch if said arm engages a sloping portion of said quadrant, indicating means for showing the relative position of said gear steps and said first named gear, operative connections between said indicating means and said setting shaft including a rack on said setting shaft, and a shaft and pinion connection to said last named rack and indicating means.

4. In a device of the character described, the combination of a drive shaft adapted to be connected to indicating mechanism, a gear cone mounted to rotate with said drive shaft, a plurality of supplemental shafts disposed around said cone and being substantially parallel with said drive shaft, a driven shaft adapted to be connected to other indicating mechanism, differentially arranged gear means operatively connecting said supplemental shafts to said driven shaft, a gear slidably and non-rotatably mounted on each of said supplemental shafts, a movable member mounted to move with each of said last named gears, a shifting gear carried by each of said movable members operatively connected to the slidable gear and adapted to engage a selected step of said cone, means for selectively engaging said shifting gear with said gear steps, said cone being recessed, and means disposed in said recess and adapted to cooperate with said cone to prevent reverse rotation of said drive shaft.

5. In a device of the character described, the combination of an operating shaft adapted to be connected to indicating mechanism, a horizontally disposed drive shaft driven by said operating shaft, gear steps mounted to rotate with said drive shaft, a supplemental shaft disposed adjacent said gear steps and being substantially parallel to the axis of said gear steps, a driven shaft adapted to be connected to other indicating means, means connecting said driven and supplemental shafts, a shifting arm movably mounted on said supplemental shaft and provided with a gear adapted to engage the selected gear steps, a connection between said gear and supplemental shaft, a gear provided on said arm, a setting shaft slidably mounted adjacent said supplemental shaft, a gear connection between said last named gear and said setting shaft, resilient means between said arm and said setting shaft urging said first named gear into engagement with a gear step, a quadrant disposed adjacent said setting shaft and having notches therein corresponding to the gear steps, sloping portions between said notches, an arm fixed to said setting shaft and movable with said gear connection, said arm being adapted to be received in a notch when the corresponding gear step is engaged by said first named gear, said spring causing said last named arm to be moved into a notch if said arm engages a sloping portion of said quadrant.

6. In a device of the character described, the combination of an operating shaft adapted to be connected to indicating mechanism, a horizontally disposed drive shaft driven by said operating shaft, gear steps mounted to rotate with said drive shaft, a supplemental shaft disposed adjacent said gear steps and being substantially parallel to the axis of said gear steps, a driven shaft adapted to be connected to other indicating means, means connecting said driven and supplemental shafts, a shifting arm movably mounted on said supplemental shaft and provided with a gear adapted to engage the selected gear steps, a connection between said gear and supplemental shaft, a gear provided on said arm, a setting shaft slidably mounted adjacent said supplemental shaft, a gear connection between said last named gear and said setting shaft, resilient means between said arm and said setting shaft urging said first named gear into engagement with a gear step, a quadrant disposed adjacent said setting shaft and having notches therein corresponding to the gear steps, sloping portions between said notches, an arm fixed to said setting shaft and movable with said gear connection, said arm being adapted to be received in a notch when the corresponding gear step is engaged by said first named gear, said spring causing said last named arm to be moved into a notch if said arm engages a sloping portion of said quadrant, said gear steps having a recess forming a ratchet member, a slidable member extending substantially across said recess and of such length that when in way of one ratchet step it is clear of the opposite step, said slidable member permitting unobstructed rotation of said operating shaft in one direction but preventing rotation in an opposite direction.

7. In a device of the character described, the combination of a meter shaft adapted to be connected to indicating mechanism, a substantially horizontally disposed drive shaft operated by said meter shaft, concentrically arranged gear means mounted to rotate with said drive shaft and disposed on one side of said meter shaft, differential means mounted at the opposite side of said meter shaft, said differential means being adapted to be connected to other indicating mechanism, connecting means between said differential means and said gear means so constructed and arranged that it can selectively engage said gear means, a third indicating means, and means operatively connected to said third indicating means and said connecting means whereby selective engagement of said gear means controls movement of and is shown by said third indicating means.

8. In a device of the character described, the combination of speed variating means, indicating means adapted to show the setting of said speed variating means, setting means for varying the speed variating means and indicating means, said setting means including locking means, a member having cooperative engagement with said locking means for locking said speed variating means in operative condition, said member being movable in one direction for moving said member to unlocked position with respect to said locking means and rendering said variating means inoperative and thereafter movable to set said variating means, and means operatively connecting said member and said indicating means whereby movement of said member correspondingly moves said indicating means.

9. In a device of the character described, the combination of a driving shaft, speed variating mechanism driven by said shaft, said speed variating mechanism including adjustable means for varying the setting of said speed variating mechanism, setting means for setting said speed variating mechanism including an operating member, means operatively associated with said operating member and said adjustable means, said last named means including releasable locking means for said speed variating mechanism, an operative connection between said setting means and said adjustable means, said setting means being operative in one direction to release said speed variating mechanism from said locking means for causing said adjustable means to be moved to render said speed variating mechanism inoperative, and movement of said setting means in another direction causing said adjustable means to be moved to a position to differently set the speed variating mechanism.

10. In a device of the character described, the combination of a driving shaft, speed variating mechanism driven by said shaft, said speed variating mechanism including adjustable means for varying the setting of said speed variating mechanism, setting means for setting said speed variating mechanism including an operating member, means operatively associated with said operating member and said adjustable means, said last named means including releasable locking means for said speed variating mechanism, an operative connection between said setting means and said adjustable means; said setting means being rotated to release said speed variating mechanism from said locking means for causing said adjustable means to be moved to render said speed variating mechanism inoperative, said setting means being bodily moved, causing said adjustable means to be moved to a position to differently set the speed variating mechanism.

11. In a device of the character described, the combination of a driving shaft, speed variating mechanism driven by said shaft, said speed variating mechanism including adjustable means for varying the setting of said speed variating mechanism, setting means for setting said speed variating mechanism including an operating member, means operatively associated with said operating member and said adjustable means, said setting means being operative in one direction for causing said adjustable means to be moved to render said speed variating mechanism inoperative, movement of said setting means in another direction causing said adjustable means to be moved to a position to differently set the speed variating mechanism, indicating means for visibly showing the setting of said speed variating mechanism, and a connection between said speed variating mechanism and said indicating means.

12. In a device of the character described, the combination of a driving shaft, speed variating mechanism driven by said shaft, said speed variating mechanism including adjustable means for varying the setting of said speed variating mechanism, setting means for setting said speed variating mechanism including an operating member, means operatively associated with said operating member and said adjustable means, said setting means being rotated for causing said adjustable means to be moved to render said speed variating mechanism inoperative, said setting means being bodily moved for causing said adjustable means to be moved to a position to differently set the speed variating mechanism, indicating means for visibly showing the setting of said speed variating mechanism, a connection between said setting means and said indicating means, said last named connection including a rack provided on said setting means, and a pinion operatively connected to said indicating means.

HARVEY L. SPAUNBURG.
EDWARD A. SLYE.